United States Patent
Juhl et al.

(10) Patent No.: US 11,449,663 B2
(45) Date of Patent: *Sep. 20, 2022

(54) DEVICE DEPENDENT RENDERING OF PDF CONTENT INCLUDING MULTIPLE ARTICLES AND A TABLE OF CONTENTS

(71) Applicant: Issuu, Inc., Palo Alto, CA (US)

(72) Inventors: Erik Allan Juhl, København (DK); Anders Peter Fugmann, Værløse (DK)

(73) Assignee: Issuu, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/340,511

(22) Filed: Jun. 7, 2021

(65) Prior Publication Data

US 2022/0156446 A1     May 19, 2022

Related U.S. Application Data

(63) Continuation of application No. 17/099,449, filed on Nov. 16, 2020, now Pat. No. 11,030,387.

(51) Int. Cl.
    *G06F 40/106*      (2020.01)
    *G06F 40/131*      (2020.01)
    *G06F 40/137*      (2020.01)

(52) U.S. Cl.
    CPC .......... *G06F 40/106* (2020.01); *G06F 40/131* (2020.01); *G06F 40/137* (2020.01)

(58) Field of Classification Search
    CPC ..... G06F 40/106; G06F 40/131; G06F 40/137
    See application file for complete search history.

(56) References Cited

U.S. PATENT DOCUMENTS 5,819,301 A    10/1998    Rowe et al.
7,853,866 B2 *   12/2010    Tanaka ............... G06K 9/00469
                                                           715/205

(Continued)

FOREIGN PATENT DOCUMENTS

WO     WO-2008130501 A   *   10/2008           G06F 16/313

OTHER PUBLICATIONS

Ramanathan, Charashekar et al, "Challenges in Generating in Bookmarks from TOC Entries in e-Books", In Proceedings of the 2012 ACM symposium on Document engineering, Association for Computing Machinery, New York, NY, USA, 2012, pp. 37-40.

(Continued)

*Primary Examiner* — Asher D Kells
(74) *Attorney, Agent, or Firm* — Haynes Beffel & Wolfeld LLP; Paul Durdik

(57) ABSTRACT

The technology disclosed relates to systems and methods for device-dependent display of an article from a PDF file that has multiple articles and a table of contents to the articles. The system can use a library to render the article from the PDF file. The rendering can include bounding boxes positioned at on-page coordinates that can include one or more images and multiple text blocks of glyphs. The system can detect at least one table in the PDF file that includes pages numbers and multiple columns. The system includes logic to partition a contiguous sequence of text representing the table into text blocks of entries and columns. The system includes logic to merge multiple text blocks that align horizontally with a single page number into a single text block. Table of contents is displayed in a device-dependent format including the entries from the merged text blocks.

20 Claims, 17 Drawing Sheets

(56) References Cited

U.S. PATENT DOCUMENTS

| | | | | |
|---|---|---|---|---|
| 7,979,785 | B1* | 7/2011 | Wang | G06F 16/9577 |
| | | | | 715/200 |
| 8,209,600 | B1* | 6/2012 | Koh | G06F 40/103 |
| | | | | 715/244 |
| 9,224,041 | B2* | 12/2015 | Dejean | G06K 9/00469 |
| 10,108,695 | B1* | 10/2018 | Yeturu | G06F 16/285 |
| 10,839,161 | B2 | 11/2020 | Galitsky | |
| 2006/0242166 | A1 | 10/2006 | Larcheveque et al. | |
| 2006/0248070 | A1* | 11/2006 | Dejean | G06F 40/137 |
| 2007/0196015 | A1* | 8/2007 | Meunier | G06F 40/258 |
| | | | | 382/190 |
| 2008/0263023 | A1* | 10/2008 | Vailaya | G06F 16/148 |
| 2008/0263032 | A1* | 10/2008 | Vailaya | G06F 16/334 |
| 2008/0263033 | A1* | 10/2008 | Vailaya | G06F 16/334 |
| 2009/0144277 | A1* | 6/2009 | Trutner | G06F 40/137 |
| 2009/0144614 | A1* | 6/2009 | Dresevic | G06F 40/137 |
| | | | | 715/239 |
| 2010/0174985 | A1 | 7/2010 | Levy et al. | |
| 2012/0102388 | A1* | 4/2012 | Fan | G06F 40/117 |
| | | | | 715/234 |
| 2012/0159313 | A1* | 6/2012 | Dejean | G06F 40/106 |
| | | | | 715/247 |
| 2014/0208191 | A1 | 7/2014 | Zaric et al. | |
| 2014/0225928 | A1 | 8/2014 | Konnola et al. | |
| 2014/0258851 | A1* | 9/2014 | Sesum | G06F 40/151 |
| | | | | 715/249 |
| 2014/0281939 | A1* | 9/2014 | Agrawal | G06F 40/10 |
| | | | | 715/256 |
| 2015/0154308 | A1 | 6/2015 | Hagg et al. | |
| 2018/0366013 | A1 | 12/2018 | Arvindam | |
| 2019/0108204 | A1 | 4/2019 | Ghosh et al. | |
| 2019/0251163 | A1 | 8/2019 | Bellert | |
| 2020/0175101 | A1 | 6/2020 | Holmberg-Nielsen et al. | |
| 2020/0293607 | A1 | 9/2020 | Nelson et al. | |
| 2021/0065569 | A1 | 3/2021 | Arvindam | |

OTHER PUBLICATIONS

Marinai, Simone et al, "Table of Contents Recognition for Converting PDF documents in E-book Formats", Proceedings of the 10th ACM Symposium on Document Engineering, Association for Computing Machinery, New York, NY, USA, pp. 73-76.

U.S. Appl. No. 17/099,449—Notice of Allowance dated Jan. 28, 2021, 9 pages.

Ramanathan, Chandrashekar et al,"Challenges in Generating Bookmarks from TOC Entries in e-Books", In Proceedings of the 2012 ACM symposium on Document engineering, Association for Computing Machinery, New York, NY, USA, 2012, pp. 37-40.

Ishitani, Yasuto, "Document Transformatoin System from Papers to XML Data Based on Pivot XML Document Method", Seventh International Conference on Document Analysis and Recoginition, 2003, 6 pages.

U.S. Appl. No. 17/099,441—Notice of Allowance dated Dec. 8, 2021, 17 pages.

Bast, Hannah, et al, "A Benchmark and Evaluation for Text Extraction from PDF", 2017 ACM/IEEE Joint Conference on Digital Libraries (JCDL), DOI: 10.1109/JCDL.2017.799164, pp. 1-10, 2017 (Year: 2017).

U.S. Appl. No. 17/099,441—Office Action dated Jul. 23, 2021, 13 pages.

U.S. Appl. No. 17/099,441—Response to Office Action dated Jul. 23, 2021 filed Oct. 22, 2021, 21 pages.

* cited by examiner

Element 1

```
401
403 ─ geometry {
        matrix: 1
        matrix: 0
        matrix: 0
        matrix: 1
        matrix: 56.692997
        matrix: 151.088888
405 ─   box {
        y1: 17.3757229
        x2: 86.7794647
        y2: -0.470953941
        }
    }
407 ─ text_block {
        text: "On Cats"
        char_offsets: 0
        char_offsets: 19.2595329
        char_offsets: 39.237896
        char_offsets: 39.237896
        char_offsets: 57.1341515
        char_offsets: 69.5276794
        char_offsets: 77.7817698
        char_advances: 18.3919926
        char_advances: 19.2114983
        char_advances: 0
        char_advances: 16.7064724
        char_advances: 12.0860798
        char_advances: 8.1053648
        char_advances: 8.99769878
409 ─   font_info {
        font_name: "MCJHQI+Times-Bold"
        font_size: 24.7870502
        font_ascent: 18.5903863
        font_descent: 6.19676208
        font_width: 1.80273426
        font_height: 0.99999994
        lowercase_char {
        char_code: 117
        }
        uppercase_char {
        width: 12.914053
        height: 12.2200155
        char_code: 68
        }
        }
    }
```

FIG. 4A

Element 2

411

403 — geometry {
matrix: 1
matrix: 0
matrix: 0
matrix: 1
matrix: 56.692997
matrix: 232.281982
}

405 — box {
y1: 34.7937965
x2: 30.9623356
}
}

407 — text_block {
text: "L"
char_offsets: 0
char_advances: 30.9623356

409 — font_info {
font_name: "IRCGFN+Times-Roman"
font_size: 51.7764816
font_ascent: 38.8323593
font_descent: 12.9441195
font_width: 1.72119129
font_height: 0.99999994
lowercase_char {
char_code: 117
}
uppercase_char {
width: 24.3349476
height: 24.4902763
char_code: 88
}
}
}

FIG. 4B

Element 4

Element 5

```
403 ─── geometry {
         matrix: 1
         matrix: 0
         matrix: 0
         matrix: 1
         matrix: 156.755
         matrix: 203.391052
405 ─── box {
         y1: 8.28493309
         x2: 11.5965147
         y2: -0.167372376
         }
         }
407 ─── text_block {
         text: "do"
         char_offsets: 0
         char_offsets: 5.97758484
         char_advances: 5.86998844
         char_advances: 5.61893
409 ─── font_info {
         font_name: "IRCGFN+Times-Roman"
         font_size: 11.9551697
         font_ascent: 8.96637726
         font_descent: 2.98879218
         font_width: 1.72119129
         font_height: 0.99999994
         lowercase_char {
         char_code: 117
         }
         uppercase_char {
         width: 5.61893
         height: 5.65479565
         char_code: 88
         }
         }
         }
```

Element 6

451

```
403 ─ geometry {
        matrix: 1
        matrix: 0
        matrix: 0
        matrix: 1
        matrix: 168.709991
        matrix: 203.391052
405 ─  box {
        y1: 8.32079792
        x2: 27.5566692
        y2: -0.167372376
        }
        }
407 ─  text_block {
        text: "lor sit"
        char_offsets: 0
        char_offsets: 3.31158447
        char_offsets: 9.28916931
        char_offsets: 16.2590332
        char_offsets: 16.2590332
        char_offsets: 20.9095917
        char_offsets: 24.2211761
        char_advances: 3.07247853
        char_advances: 5.61893
        char_advances: 4.01693678
        char_advances: 0
        char_advances: 4.16039896
        char_advances: 3.07247853
        char_advances: 3.33549237
409 ─  font_info {
        font_name: "IRCGFN+Times-Roman"
        font_size: 11.9551697
        font_ascent: 8.96637726
        font_descent: 2.98879218
        font_width: 1.72119129
        font_height: 0.99999994
        lowercase_char {
        char_code: 117
        }
        uppercase_char {
        width: 5.61893
        height: 5.65479365
        char_code: 88
        }
        }
        }
```

FIG. 4F

Element 7

FIG. 6A

TABLE OF CONTENTS

This is an example of the
table of contents extraction algorithm

Introduction     1
   This is a brief
   introduction to TOC
   extraction

Algorithm     4
   A description of the
   algorithm

Conclusion     7
   A conclusion over
   the findings

Toc entry { title: "Introduction"; page: 1; description "this is a brief introduction" }

Toc entry { title: "Algorithm"; page: 4; description: "a description of the algorithm" }

Toc entry { title: "Conclusion"; page: 7, description: "A conclusion over the findings" }

FIG. 7B

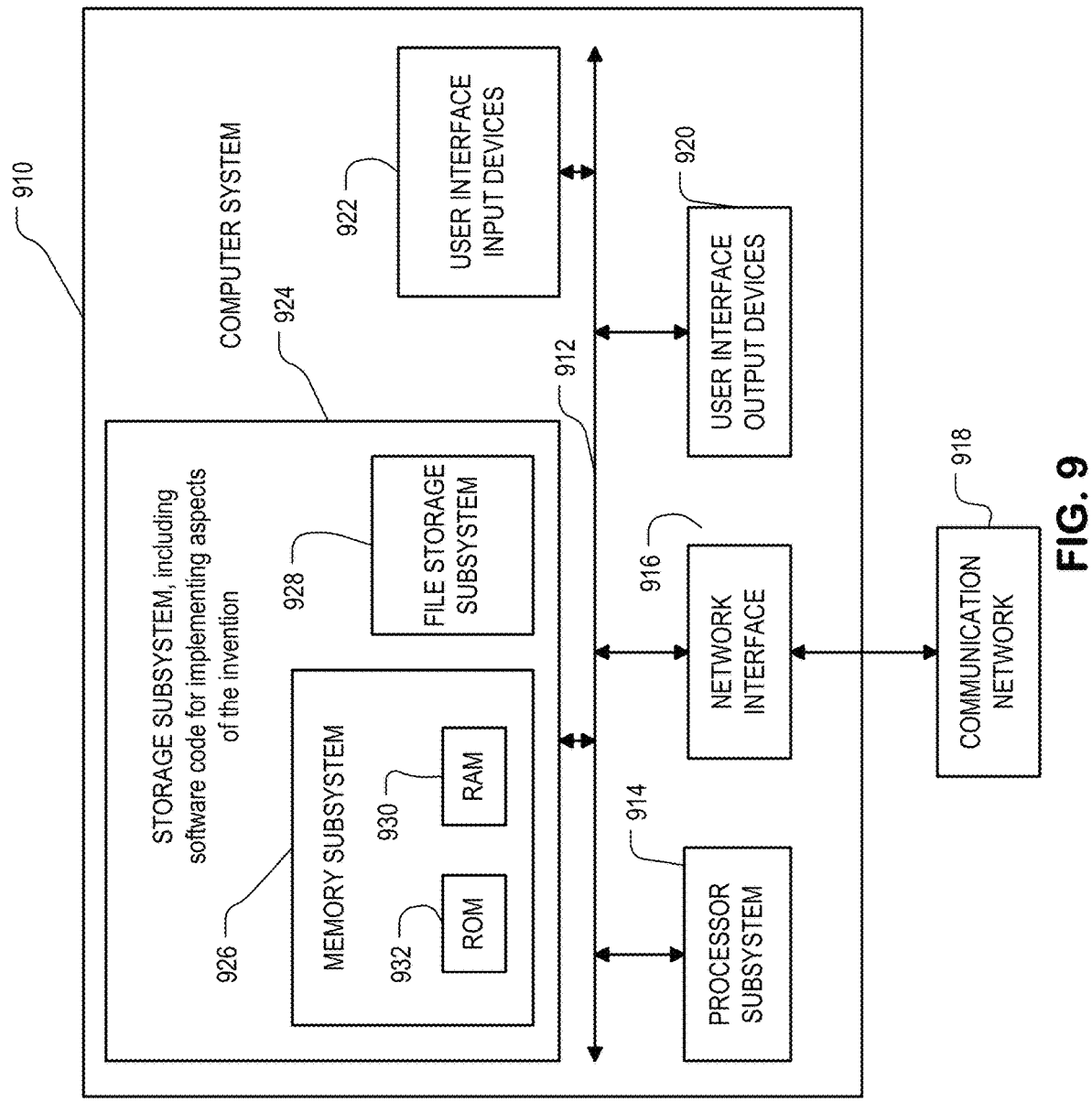

DEVICE DEPENDENT RENDERING OF PDF CONTENT INCLUDING MULTIPLE ARTICLES AND A TABLE OF CONTENTS

PRIORITY APPLICATION

This application is a continuation of U.S. patent application Ser. No. 17/099,449, entitled "DEVICE DEPENDENT RENDERING OF PDF CONTENT INCLUDING MULTIPLE ARTICLES AND A TABLE OF CONTENTS," filed Nov. 16, 2020. The non-provisional application is incorporated by reference for all purposes.

RELATED APPLICATIONS

This application is related to U.S. patent application Ser. No. 17/099,441, titled "DEVICE DEPENDENT RENDERING OF PDF CONTENT", filed Nov. 16, 2020, which is incorporated by reference herein for all purposes.

FIELD OF THE TECHNOLOGY DISCLOSED

The technology disclosed relates to automatically adapting content of PDF files from a print format to displays of small-format devices.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

With the rise of electronic publishing, more and more readers are viewing published documents such as magazines, newspapers, catalogs, brochures, trade and scientific journal and the like on electronic devices. These documents are generally made available to electronic publishers as portable document format (PDF) files and are formatted for print rather than viewing on electronic devices. Navigation in an electronic document described in a PDF file can be cumbersome, particularly on an electronic or computing device having a small screen such as a mobile phone or a small tablet. The PDF files can be prepared using a variety of software tools. Many of these tools do not provide additional information about the content in the PDF file that can be easily extracted and used for displaying the content of files on computing devices with small display screens. Therefore, the articles are displayed on computing devices with small screen using the page-oriented format which is not suitable for reading magazine articles on small format displays.

An opportunity arises to automatically translate content of an article from a PDF file for display on computing devices with small display screens upon accessing of the PDF file by the small-format device.

BRIEF DESCRIPTION OF THE DRAWINGS

FIGS. 4A, 4B, 4C, 4D, 4E, 4F and 4G present examples of information about images and text blocks in bounding boxes in FIG. 3.

FIGS. 6A and 6B present examples of pages in a PDF file including a Table of Contents.

FIG. 7B presents examples of Table of Content entries generated from the tree data structure of FIG. 7A.

FIG. 9 presents an example computer system implementing the system of FIG. 1.

DETAILED DESCRIPTION

Figure 1:
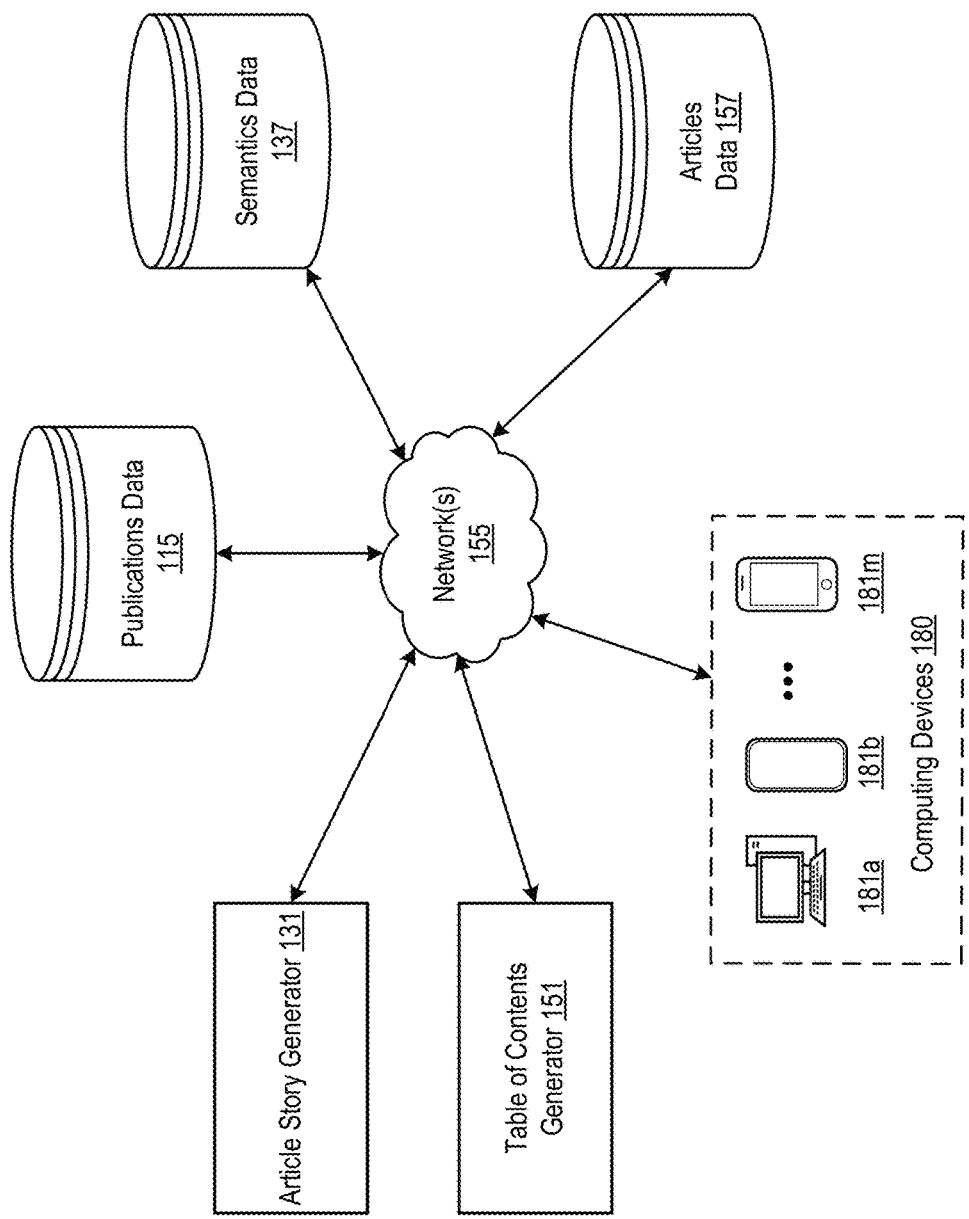
FIG. 1 illustrates a block diagram of an example environment for automatically adapting content of PDF files from a print format to displays of small-format devices.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

Portable document format (or PDF) is a standardized, widely used file format to present documents including text and images. PDF file format is popular for presenting magazines, articles, product brochures or flyers in which publishers want to preserve graphic appearance of content. PDF files are page oriented and are suitable for viewing on relatively larger screen sizes such as desktop or laptop computers, tablets, etc. With popularity of mobile computing devices such as smart phones, many readers are viewing PDF files on their mobile computing devices. Such devices have smaller display screens. The pages of PDF files often appear with very small font sizes on displays of mobile devices and are not suitable for reading magazine articles.

To improve readability on small format displays, Adobe™ supports the open source EPUB file format as an alternative to PDF files. Adobe's InDesign product provides a variety of format controls suitable for electronic publishing. See, e.g., <https://www.shutterstock.com/blog/tips-creating-ebooks-epubs-indesign> for a beginner's guide to using InDesign to prepare EPUB files. Alternatively, PDFs can initially be designed for a cell phone format, using a PDF page template. However, this does not convert a PDF of a magazine, for instance, with a multi-column print format intent, into a format suitable for a cell phone.

To help authors modify content, Microsoft™ added a PDF reflow feature that imports PDF files into MS Word™ for editing. A Word formatted file can readily be edited and page size revised. This again is an authoring process, not a reader's tool.

The technology disclosed addresses the above-mentioned challenges in adapting the content of PDF files from a print format to a mobile format automatically, without relying on authoring tools or requiring style metadata such as tags or markers inserted into the PDF file during file creation. A PDF file of interest can be translated in real time, using local resources, for device-dependent display on a small-format device. Translation can be initiated upon accessing of a PDF file by the small format device.

Rendering a PDF for display, either printed publication or on graphic display, is complex and a moving target, as PDF versions progress. The technology disclosed relies on a third-party library to render a PDF file, effectively translating it from what we call a PDF domain to a rendered glyph domain. In the rendered glyph domain, PDF codes are rendered into objects including bounding boxes that locate glyphs and images on pages. Examples appear in the figures. Glyphs are accompanied by font information. The rendered objects in the rendered glyph domain are insensitive to the original version of the PDF file and to the authoring tool used. The technology disclosed applies paragraph consolidation, semantic analysis of text and image elements, read ordering, and reflow to produce a device-dependent format suitable for small screens. It automatically translates content from the rendered glyph domain to a so-called small-format reflow domain, which can include images in an ordered reading reflow.

Successful translation from the rendered glyph domain to the small-format reflow domain, for display on small format devices, includes arranging elements from the glyph domain in a correct reading order. Columns can be recognized by so-called valleys that separate them. Elements that confuse ordering among text boxes, such as pull out quotes and images, can be removed for flow purposes and an article can be reflowed into a reading order. Taking into account the reading order, adjoining and consecutive text boxes are consolidated (and may be split) to form paragraphs, based on analysis of text elements in adjoining or successive text boxes. The technology disclosed labels the paragraphs by their typographical role, such as headline text, subtitle text, body text, byline text, image attribution text, and image caption text. Some bounding boxes are self-identified as holding images. We refer to content after at least these actions as translated into the small-format reflow domain. In this domain, changes are made to appearance, page layout or line breaks of text from an original document to a revised version. It is important to assure that no material (including graphics) is inadvertently omitted in the reflow domain by reflowing the text.

A second automated process applies to magazines and longish articles that have a table of contents. A table of contents appears near the front of a PDF file, for instance in the first quarter of the file, by page count. The technology disclosed recognizes a table as the Table of Contents. If there are multiple tables, one can be identified as the Table of Contents. Entries and corresponding page numbers are parsed from content in the rendered glyph domain to advance the Table of Contents into the small-format reflow domain. The technology disclosed links entries in the Table of Contents to offset locations within the PDF at which titles or subtitles are found that match entries in the Table of Contents. Sections of the PDF can be prepared for reading immediately, in the background, for instance, or in response to selection of an entry from a displayed table of contents.

From the small-format reflow domain, the technology disclosed can cause display of content from an article, originally intended for print, on the screen of a small-format device, such as a cell phone. This can be done automatically, using resources of the local, small-format device.

Environment

We describe a system for device-dependent display of an article from a PDF file. The article in the PDF file can have multiple columns in one or more parts of the article. The PDF file can include magazine articles, product brochures, etc. We refer to the device-dependent display of the article from the PDF file as an article story. The article stories are suitable for viewing on computing devices with small format displays such as smart phones, personal digital assistants, tablets, etc. The system is described with reference to FIG. 1 showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes the system 100. This paragraph names labeled parts of system 100. The figure illustrates an article story generator 131, a table of contents generator 151, computing devices 180, a publications database 115, a semantics database 137, an articles database 157, and a network(s) 155. The computing devices 180 can include a variety of devices that users of the technology disclosed can use to read PDF files, for example, a desktop computer 181$a$, a personal digital assistance 181$b$, a smart phone 181$m$, etc. The technology disclosed can be used to display content from an article in a PDF file on a variety of computing devices. Examples of computing devices listed above are for illustration purpose and are not intended to cover the entire spectrum of computing devices on which article stories can be displayed using the technology disclosed. The network(s) 155 couples the computing devices 180, the article story generator 131, the table of contents generator 151, the publications database 115, the semantics database 137, and the articles database 157 in communication with each other.

We now refer to FIG. 1 to provide description of components of the system 100. The publications database 115 can include one or more publications published by one or more publishers. The publications can be in the form of electronic documents. The electronic documents can be stored in portable document format (PDF) files. A PDF file can contain one or more articles. The articles can contain text, images, etc. The text can be arranged multiple columns.

The article story generator 131 can access the publications data via the network(s) 155 and receive an electronic publication document stored in the publications database 115. The article generator 151 includes logic to use a third-party library such as PDFium (available at <pdfium.googlesource.com/pdfium/>) to render an article in a PDF file into the rendered glyph domain. This can result in rendering of bounding boxes positioned at on-page coordinates. The bounding boxes can contain text blocks of glyphs and images. The font information of text in text blocks is also made available by the third-party library. The electronic publication article in the PDF file can include images, text, tables, etc. The text can be organized in paragraphs arranged in one or more columns separated by whitespaces. Articles can have headlines or titles and may contain pull out quotes that span multiple columns.

The article story generator 131 can set a reading order for the article after rendering the article from the PDF file. The system includes logic to remove text blocks that can confuse the reading order of the article before setting the reading order. Examples of such text blocks include pull out quotes that span multiple columns or have width more than half of the width of the page. The system can remove bounding boxes containing images when setting a reading order for the article. The system can also remove headers and footers in the article from PDF file by locating text residing in the top or bottom page margins.

Paragraphs of text are formed by merging or splitting text blocks as they appear in the reading order. The system can use information about starting and ending positions of horizontally arranged text elements to delimit the paragraphs. For example, if the starting position of the text block starts after alignment of other vertically arranged text blocks, then it can identify starting of a paragraph. Similarly, if the last text block in a horizontal line of text blocks ends before other text blocks that are positioned vertically above then it can indicate ending of a paragraph. Other information, such as capitalization, drop cap letters, etc. can be utilized for delimitation of paragraphs of texts.

The third-party library does not provide contextual and semantic information about text blocks in the bounding boxes. Without the semantic information, it is difficult to translate the article in a device-dependent form. The article story generator 131 can infer semantic information about typographic roles of paragraphs in the article. The semantic information can be used to label the paragraphs by their typographical role such as headline text, subtitle text, body text, byline text, image attribution text, image caption text, etc. Some other bounding boxes are self-identified as holding images. The system can then use the above information to display the article from PDF file in a device-dependent formation. We refer to the content after the above actions as translated into small-format reflow domain. The article story in small-format reflow domain can be displayed for convenient reading on a computing device with a small display such as a smart phone.

Magazines with multiple articles and long articles can have table of contents to the articles or sections within an article. The table of contents generator 151 includes logic to automatically process magazines and articles that have table of contents. An article can have one or more tables. The technology disclosed can recognize a table as the Table of Contents (TOC). Entries and corresponding page numbers are parsed from content in the rendered glyph domain to create table of contents in small-format reflow domain. The system includes logic to validate table of contents by detecting the headlines or titles of articles in the body of the PDF file which appear in an order in both the table of contents and the PDF file. The system can link entries in the table of contents to offset locations within the PDF at which titles or subtitles are found that match entries in the table of contents. The system can display an article on the display of the computing device when a user selects an article from the table of contents.

The technology disclosed can label paragraphs and other text elements from the PDF article by their typographical role. The system can store the classification data in the semantics database 137. For example, the database can include font information such as font names, font size distributions for headline or title text, body text, byline text, image attribution text, image captions text, etc. The system can store such data per PDF file as well as universally for all PDF files processed by the system. The semantics database is expected to grow as the system processes PDF files for different magazines. The system can update the database as it encounters new PDF files with different font information for a particular type of text. The system can also store additional information such as name of the magazine for which the semantics data applies. As the system encounters a PDF file for a particular magazine, the system can access semantics information for that magazine to annotate text paragraphs or other text elements parsed from the PDF file.

The article can be viewed or read on different types of computing devices 180 as presented in FIG. 1. The articles generated by the article generator 131 can be stored in the articles database 157. The system can also store table of contents in the articles in database 157. The articles database can be organized per magazine, per publisher, etc.

Completing the description of FIG. 1, the components of the system 100, described above, are all coupled in communication with the network(s) 155. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

System Components

Figure 2:
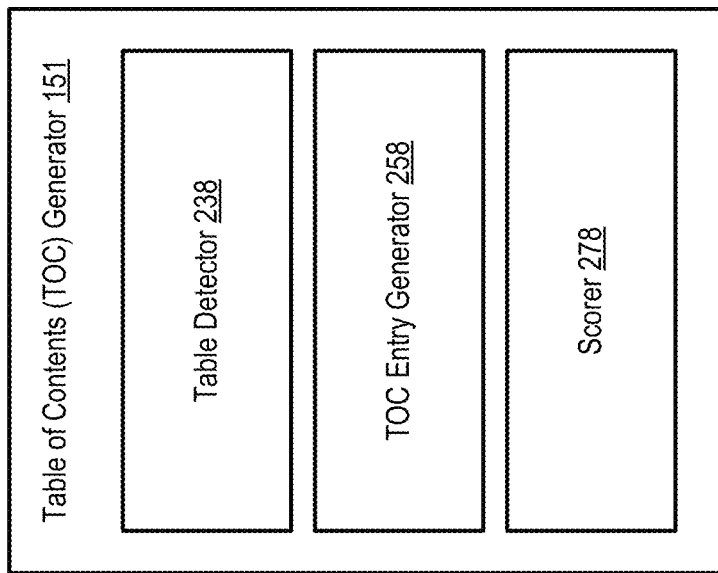
FIG. 2 presents high-level components of the system to generate article stories and Table of Contents (TOC) from content of PDF files for display on small-format devices.
Figure 2:
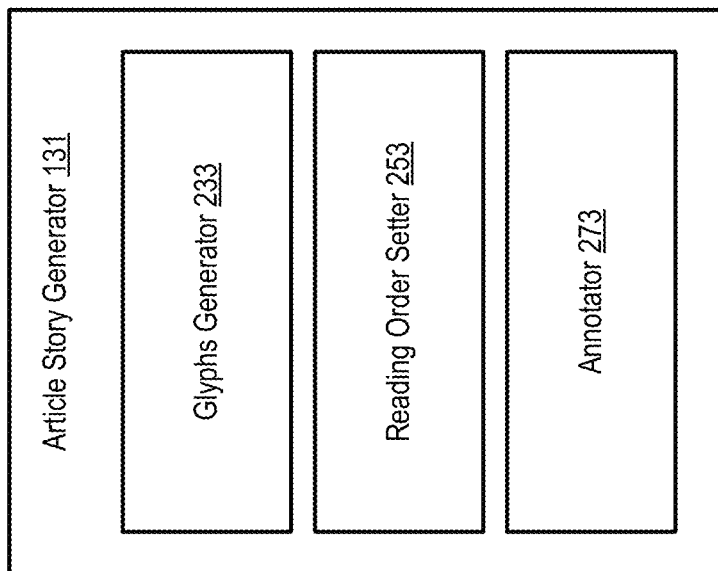

FIG. 2 presents high level components of the article story generator 131 and table of contents generator 151. The article story generator 131 comprises of a glyphs generator 233, a reading order setter 253 and an annotator 273. The table of contents generator 151 comprises of a table detector 238, a table of contents entry generator 258, and a scorer 278. The illustrated components can be further merged or separated when implemented. We now present details of the logic implemented by the components of article story generator 131 and table of contents generator 151.

Article Story Generator

The article story generator implements logic to adapt content of PDF files from a print format to a mobile format. The system can perform this adaptation automatically without relying on authoring tools or requiring style metadata such as tags or markers inserted into the PDF file during file creation. The components of article story generator including the glyph generator 233, the reading order setter 253 and the annotator 273 implement logic to translate the PDF file from print format to device-dependent display on small format device in real time using local resources. In the following sections, we present details of the components of article story generator 131.

Glyphs Generator

The glyphs generator 233 can use a third-party library to render the article from PDF file. In one implementation, the glyphs generator 233 can use a third-party library PDFium (available at <pdfium.googlesource.com/pdfium/>) to render an article in a PDF file into the rendered glyph domain. PDFium provides several API functions that can be accessed to render PDF file, get page related information, get font related information, perform text extraction from PDF file, access objects in the PDF file, etc. In addition, PDFium provides PDF file edit, security related features.

The glyphs generator accesses the PDFium library to translate it from what we call a PDF domain to a rendered glyph domain. In the rendered glyph domain, PDF codes are rendered into objects including bounding boxes that locate glyphs and images on pages of the PDF file. The glyphs are accompanied by font information of text characters. In FIGS. 4A to 4G we present various examples of the type of information that is available for text blocks and images in the bounding boxes. This translation of content in PDF file from PDF domain to rendered glyph domain does not require markers, tags, or other information about the content of the PDF file. The translation process is also independent of the authoring tool used to create the PDF.

Reading Order Setter

The reading order setter 253 includes logic to arrange elements from the glyph domain in a correct reading order in a virtual rendering domain. The reading order setter includes logic to recognize columns in the article by so-called valleys that separate them. The reading order setter can remove elements that can confuse reading order, for example, pull out quotes that can span more than half of the width of the page as well as images and headers and footers in page margins. The system can use existing techniques to determine a reading order. For example, by applying XY-cut method by Nagy and Seth 1984, published in their paper entitled, "Hierarchical representation of optically scanned documents". The XY-cut method includes finding a widest empty rectangle or valley entirely crossing the page vertically or horizontally. The method applies recursively to each block on the page. It stops when no large-enough valley can be found in any of the created blocks, resulting in the final segments or blocks.

The hierarchy of blocks generated by XY-cut method can be used to determine a reading order among the blocks. For example, for a western conventional top-bottom left-to-right reading order, ordering the block hierarchy of blocks in a top-bottom left-to-right way leads to the expected reading order (Ishitani 2003, "Document Transformation System from Papers to XML Data Based on Pivot XML Document Method").

The existing techniques such as mentioned above can incorrectly split elements of the articles in some cases. For example, a headline of an article is usually printed in large font size. A long headline can wrap in multiple horizontal lines of text. As the size of font is large, the spacing between horizontally positioned lines of headline text can be large as compared to horizontally positioned lines of body text. A same threshold value for partitioning the body text and headline text can result in splitting of headline text in multiple segments when XY-cut method is applied. The technology disclosed uses dynamically adjusted valleys by increasing a threshold for valley width when detecting a valley separating characters of larger font sizes.

The magazine articles usually present text arranged as columns of text. Therefore, the technology disclosed also includes logic to use dynamically adjusted valleys between columns of text blocks. The valley sizes between columns can be adjusted according to the font information for the glyphs in adjoining text blocks to correctly detect text blocks in different columns. The above operations result in a first reading order of text blocks in the article.

The reading order setter 253 also includes logic to merge or split blocks of text arranged in columns to form paragraphs of text. As used herein, the term "paragraph" or "text passage" means a sequence of characters. Typically, the characters in the text paragraph includes one or more sentences, and a "sentence" includes one or more words, plus spaces and punctuation. The system can identify a sentence, for example, by looking for a sequence of words that starts with a capitalized first letter and ends with a period. The reading order setter can consolidate, or split adjoining and consecutive text blocks based on analysis of text elements in adjoining or successive text blocks (or bounding boxes). By examining the text position in each column, the system can derive the column justification, i.e., left, right, centered or left/right. The system can use this information to interpret the indentations or short lines as paragraph break indicators. The system can then split large blocks of text into more than one paragraph if the text block contains multiple indented lines and text line with length shorter than the width of the column. The system can also use other information such as drop caps to detect start of paragraphs. The system may also combine text blocks to form a paragraph using the above paragraph delimiters.

The technology disclosed can further improve the first reading order determined by applying the XY-cut with dynamically adjusted valley sizes to text blocks in each column after text blocks are arranged to form paragraphs. The system can also remove other elements that are not aligned in columns of text determined by the first reading order. For example, the header and footers or pull out quotes can be removed if they are not already removed when determining the first reading order. The headers and footers are usually positioned in top or bottom page margins. The second iteration can result in a refined reading order of text blocks in the body of the article. Finally, the system can reinsert the elements removed from the article in the above process. For example, the pull out quotes and images can be reinserted in the article.

Annotator

The annotator 273 includes logic to label the paragraphs and other text blocks from the reading order setter 253 with their typographical role. Examples of typographical roles include headline text, subtitle text, body text, byline text, image attribution text, and image caption text. Additional typographical roles can be identified by the system if the article includes such elements. The annotator can use font information for sequence of glyphs to infer the semantic information about typographical roles. The font information can include font name, font size distribution or other information about the glyphs. The system can use additional information about text characters and fonts such as character offsets, character advances, font ascent, font descent, font height, font width, lower case or upper case characters, etc. to infer semantic information about typographical roles of the paragraphs in the text blocks.

Table of Contents Generator

The table of contents generator 151 implements logic to automatically process PDF files that contain magazines or longish articles that have table of contents. The table of contents generator 151 includes logic to identify entries in the table of contents and corresponding page numbers from the content in the rendered glyph domain. This information is processed to translate table of contents from PDF domain to small-format reflow domain. The table of contents generator 151 includes a table detector 238, a table of contents entry generator 258, and a scorer 278. We present details of these components in the following sections.

Table Detector

The table detector 238 can detect a table in a magazine or an article in the PDF file. The table includes the logic to detect text blocks arranged in rows and columns. A magazine or an article can have multiple tables. The system includes logic to detect tables that can be candidates for the table of contents of the magazine or the article. The table of contents can have entries for the titles or subtitles. The entries can have corresponding page numbers in the PDF file on which these titles and subtitles appear. The page numbers can be listed on left hand column or right hand column of the table. The system can parse entries and corresponding page numbers from the tables in the PDF file. If there are multiple tables, the system can parse the above information from all tables.

Table of Contents Entry Generator

The table of contents entry generator 258 includes logic to form entries of the table of contents by merging text blocks that can appear in multiple lines of text. The system can merge multiple vertically adjoining text block that align horizontally with a single page number into a single text block for an entry in the table of contents. The system can validate table of contents by detecting in a body of the PDF file a plurality of headlines of articles which appear in an order in both the table of contents and the PDF file. The table of contents entry generator can detect mismatch between a particular entry in the table of contents and an article title in the body of the PDF file. The mismatch can happen when the article title includes more or less words than the particular entry in the table of contents. When a mismatch is detected, the table of contents entry generator can merge the particular entry with an adjoining entry or split the particular entry in the table of contents to match the article title.

The table of contents entry generator can also detect that a table of contents that spans multiple pages in the PDF. The system can use the font information to distinguish table of contents entries from other text that can appear on the same pages such as header and footer or page number in the top and bottom page margins. The system can ignore the above-mentioned text elements and merge the entries on multiple pages to form the table of contents.

Scorer

The system can detect and parse multiple tables in the PDF file if they appear in the PDF file. The scorer 278 includes the logic to score each candidate for the table of contents. The scorer 278 can assign scores to candidates based on detecting in the body of the PDF file the multiple headlines of articles in the order in which the multiple headlines appear in the candidate. The candidate table with the highest score can be selected as the table of contents.

Example of Processing an Article for Device-Dependent Display

Figure 3:
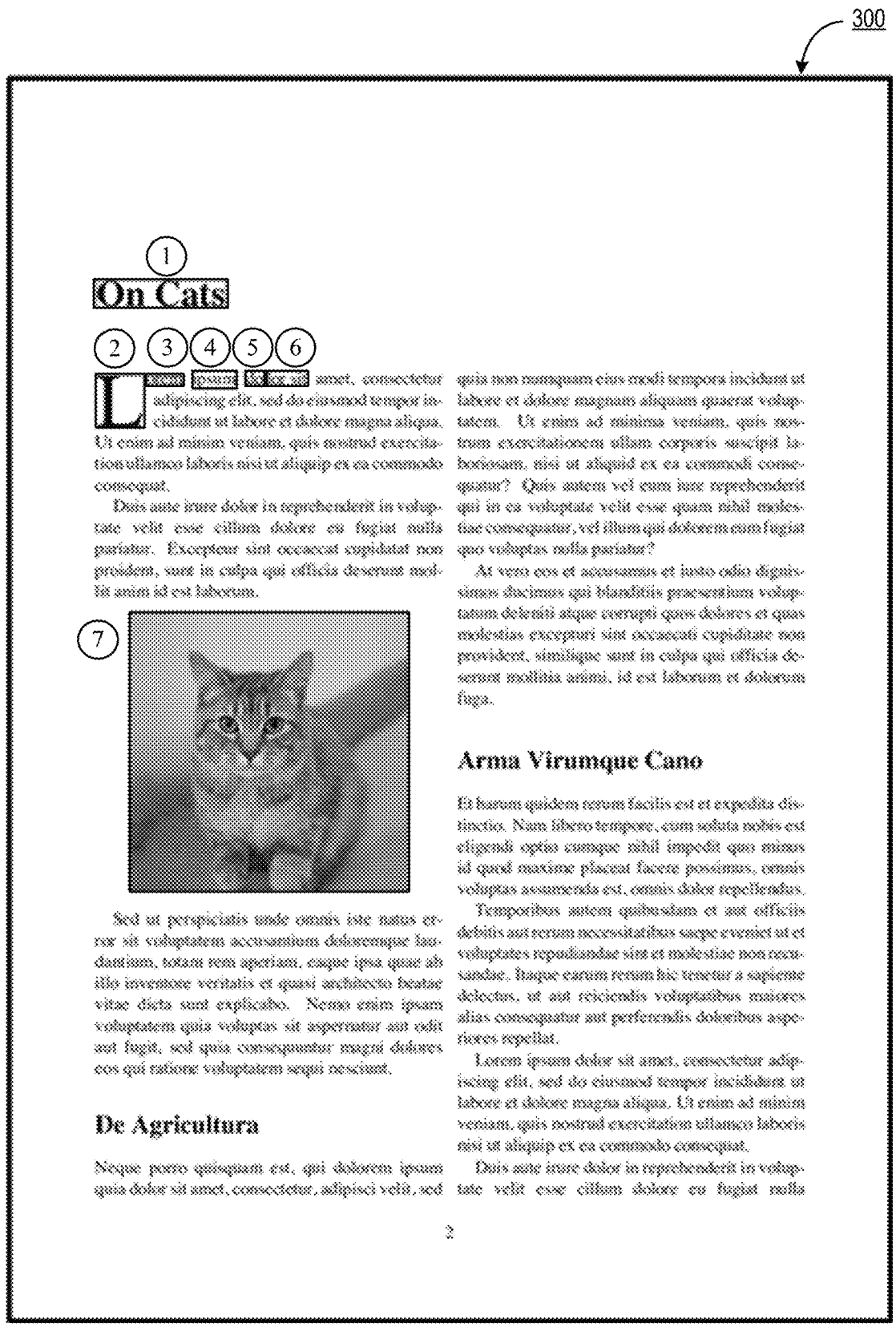
FIG. 3 presents examples of bounding boxes on a page of a PDF file containing an image and text boxes of glyphs.

FIG. 3 presents an example page 300 of an article from a PDF file. The figure illustrates seven bounding boxes labeled as 1, 2, 3, 4, 5, 6, and 7. The bounding boxes are obtained when the page is processed by the PDFium library. Note that only seven bounding boxes are shown for illustration purposes to explain the processing steps to display the article in a device-dependent format. The information for each bounding box is presented in the following figures. The bounding boxes can contain one or more images or text blocks of glyphs.

FIG. 4A presents the information 401 for element 1 in the bounding box 1 of FIG. 3. The information is organized in various groups and subgroups including geometry 403, box 405, text_block 407, and font_info 409. The box, text_block, and font info information is organized as subgroups of geometry group. The box subgroup 405 presents on-page coordinates of the bounding box 1. The text_block 407 presents the text "On Cats" positioned in the text block. The text_block includes character offsets for each of the seven characters in the text block. The offset can indicate position of the character from the starting position of the text block e.g., starting from the left boundary of the bounding box. The text_block also presents char_advances for each of the seven characters in the text block. The text_block includes font information for the text which is presented in the font_info subgroup. The font_info includes font name of the font, size, ascent, descent, width, and height of font used in the bounding box. The subgroups lowercase_char and uppercase_char present information about the lower case and upper case characters in the font.

Figure 4C:
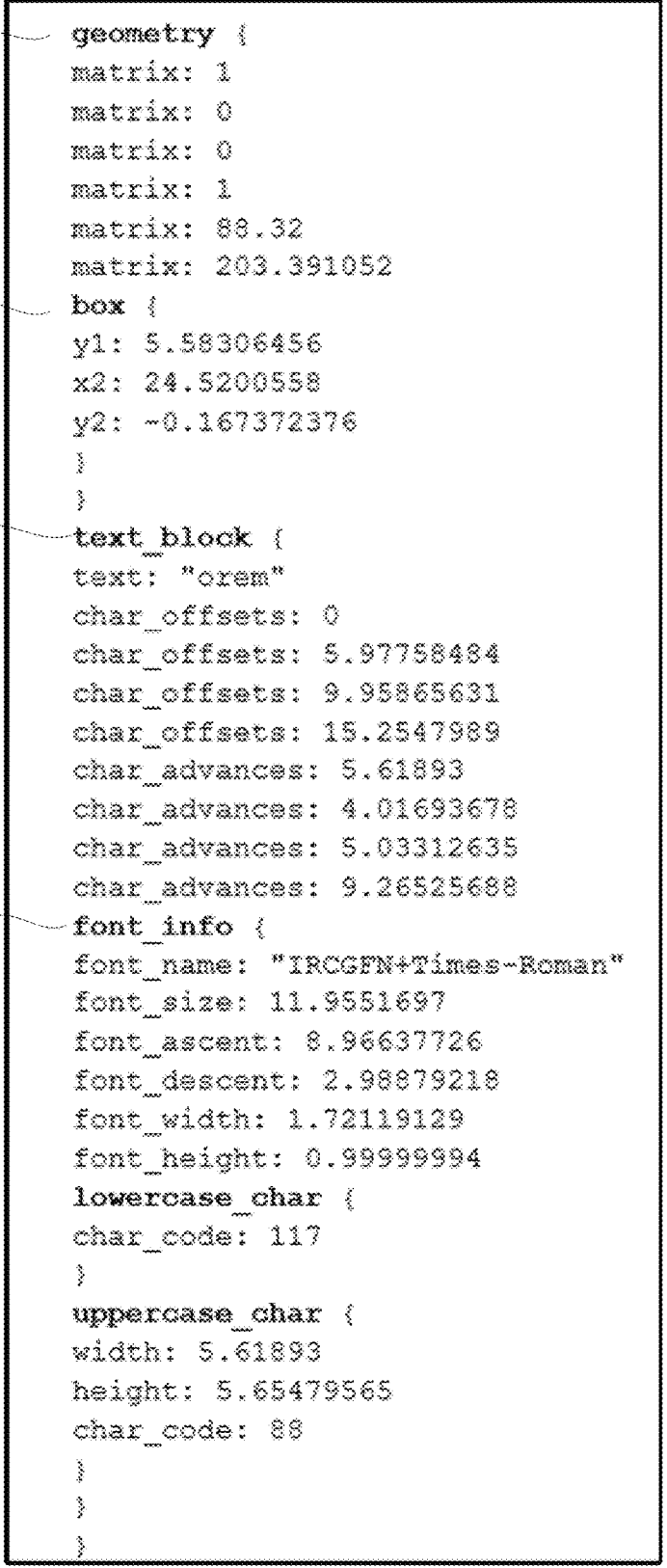

FIG. 4B presents the information 411 for the element 2 in bounding box 2 in FIG. 3. This is a textual element as in bounding box 1. The bounding box 2 includes a drop cap character "L" which is the first character in the article. Therefore, this character is the first letter of the text paragraph that follows. As we can see, the PDFium library does not provide this context about the character in the bounding box. The technology disclosed includes logic to link the drop cap letter with the text in the bounding box that follows in FIG. 4C. The illustration 421 presents information regarding element 3 in bounding box 3 of FIG. 3. The text "orem" in this bounding box is a continuation of the drop cap letter "L" in the previous bounding box but this link is not provided by the parsing library. The technology disclosed includes logic to merge the two bounding boxes to form a text block representing a word in the article.

Figure 4D:
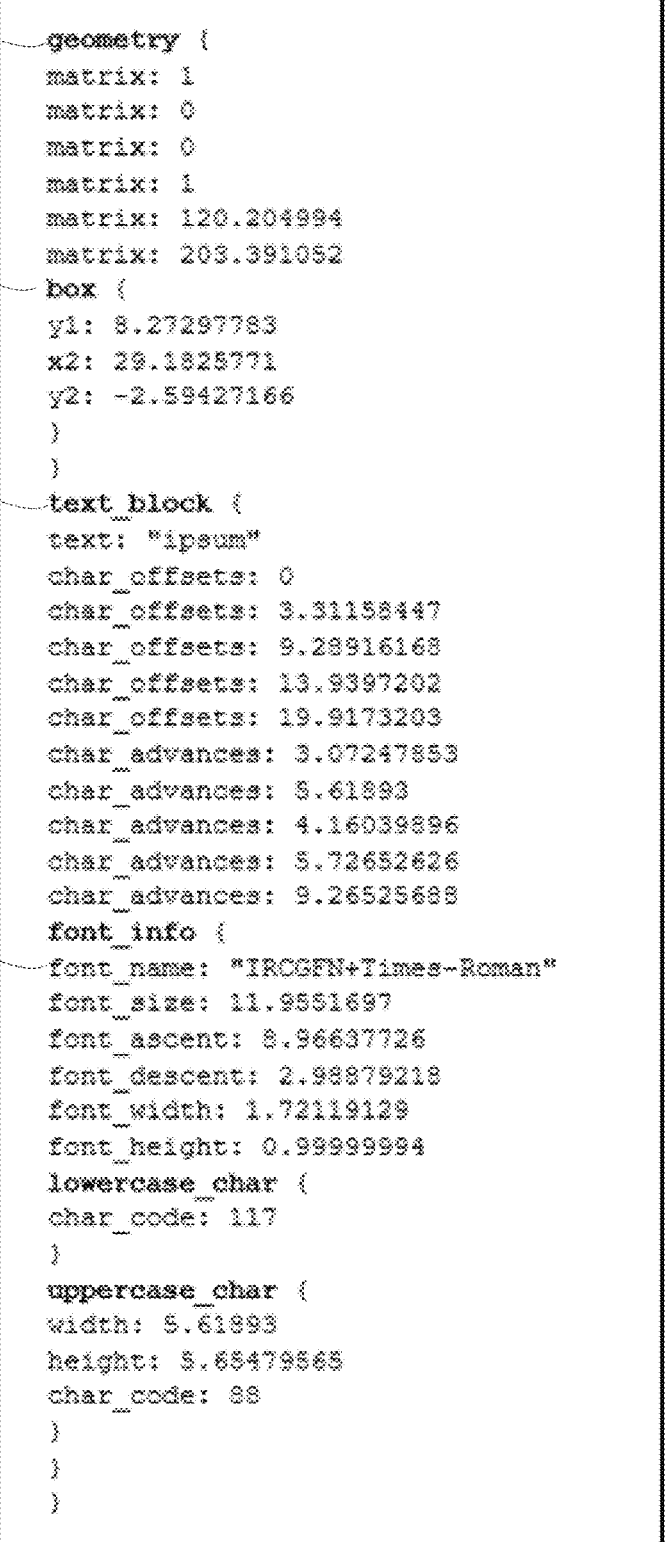

FIG. 4D includes an illustration 431 listing the information regarding element 4 in the bounding box 4 in FIG. 3. The bounding box 4 contains text "ipsum" and represents a complete word. Note, the information provided by the library does not indicate the paragraph information for this bounding box. Therefore, there is no information that indicates which paragraph this word belongs to. The technology disclosed includes logic to determine the starting and ending positions of paragraphs in the article. These delimiters are then used to combine one or more text blocks or bounding boxes to form a paragraph.

Figure 4G:
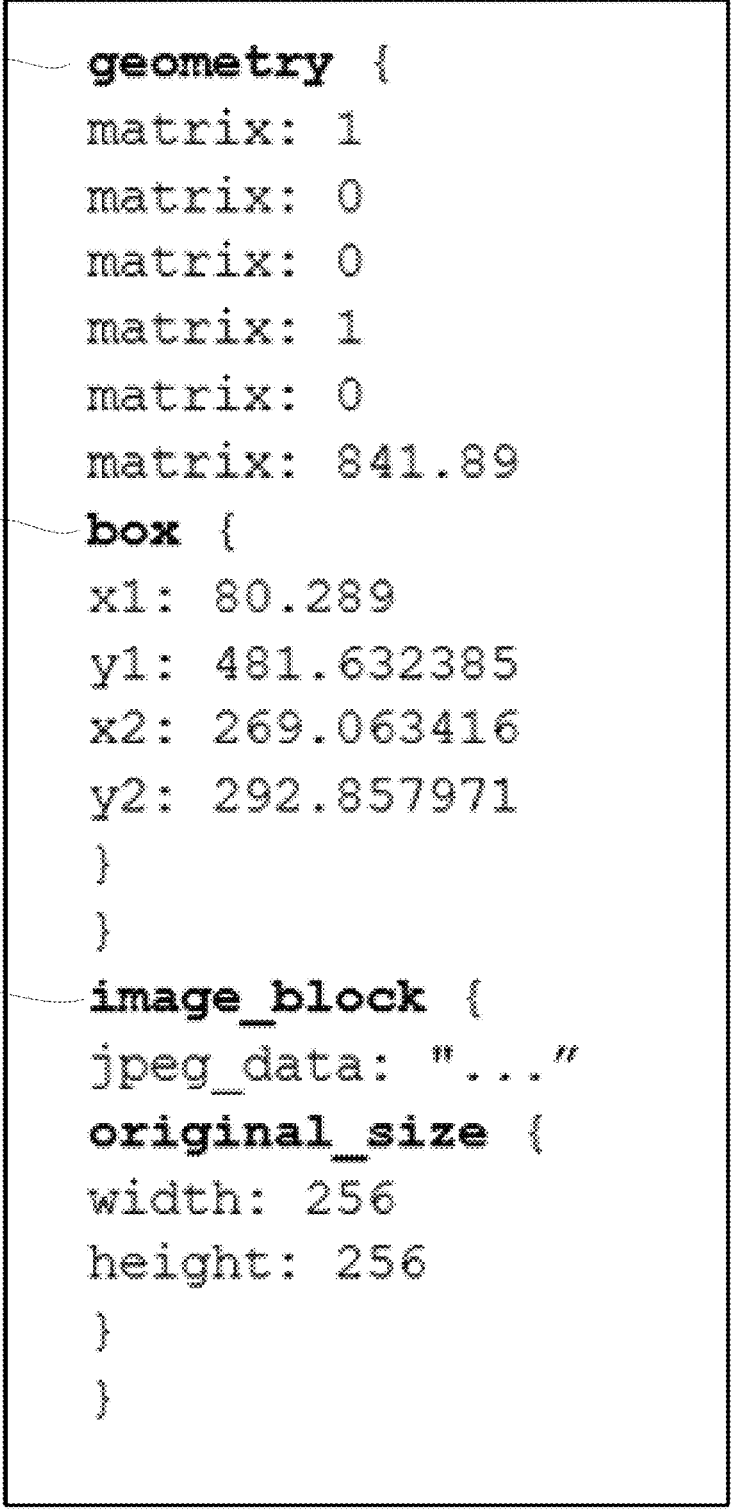

FIG. 4E presents an illustration 441 for element 5 in the bounding box 5 of FIG. 3. As we can see the text character "do" in this bounding box are part of the word that has been split into two bounding boxes by the PDF parsing library. FIG. 4F presents an illustration 451 for element 6 in bounding box 6 of FIG. 3. This bounding box contains the last portion of word for which the first two characters are presented in the previous bounding box. The bounding box 6 also contains the following word. As we can see the PDF parsing library can incorrectly split and merge characters from neighboring words or paragraphs. FIG. 4G presents information in illustration 461 regarding element 7 in bounding box 7. This bounding box contains an image. The coordinates for the image are presented in "box" group labeled as 405. The image information is presented in image_block 421 including the width and height of the image.

Figure 5:
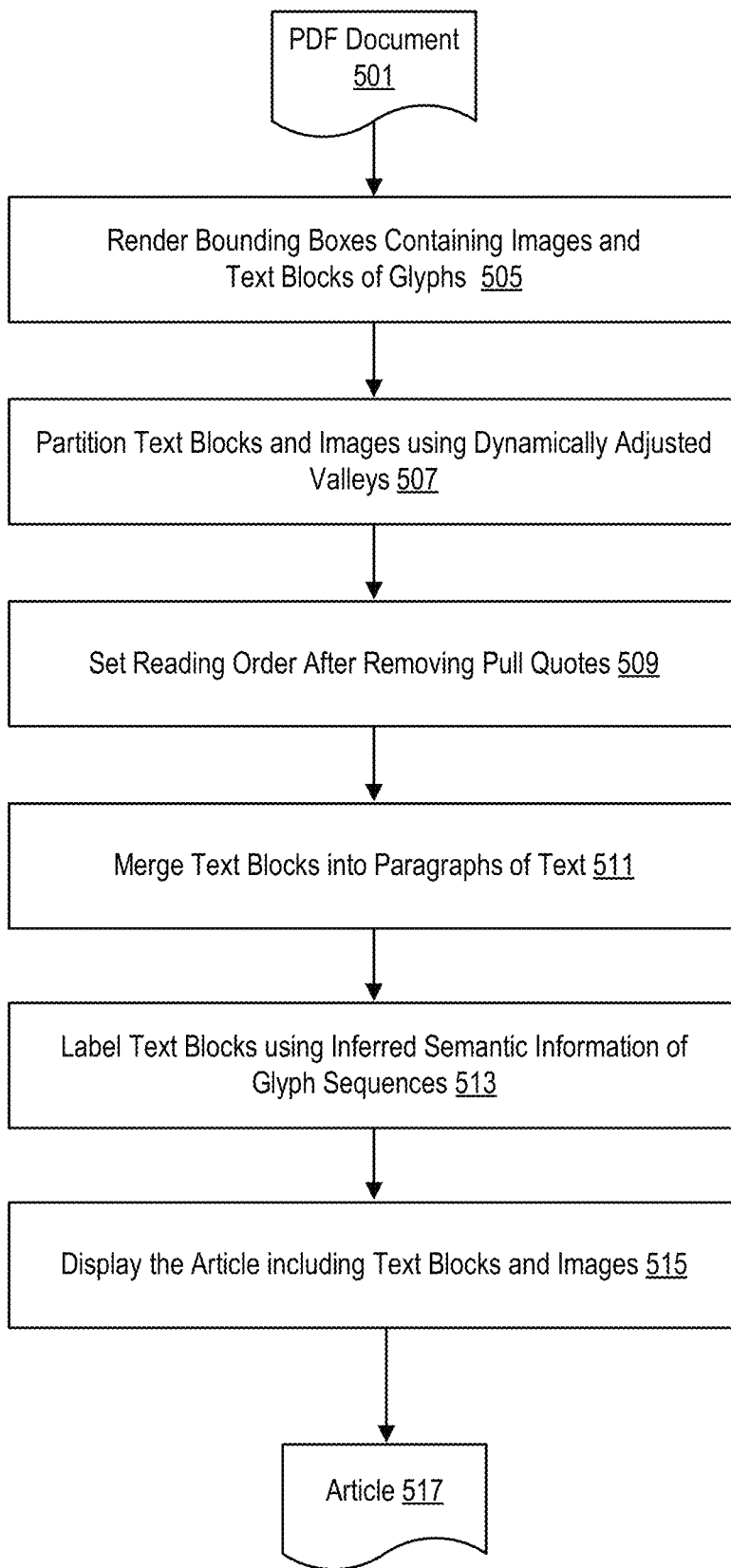
FIG. 5 presents a flowchart of process steps to generate article stories from a PDF files.

Processing Steps for Translating an Article from PDF for Device-Dependent Display FIG. 5 is a flowchart or flow diagram illustrating process steps for translating an article in a PDF file to a device-device display format. The flowchart illustrates logic executed by the client computing devices using local resources or the logic executed by the server or both. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flowcharts herein show only steps that are pertinent to an understanding of the invention, and it will be understood that numerous additional steps for accomplishing other functions can be performed before, after and between those shown.

The process starts at a step 501. The system uses a library at a step 505 to generate bounding boxes containing one or more images or text block of glyphs. The bounding boxes are positioned at on-page coordinates as shown in FIG. 3. At a step 507 the system can partition text blocks and images into two or more columns using dynamically adjusted valley or whitespaces between columns. The system can set a first reading order of the article after removing pull quotes that span more than half of the width of the page (step 509). The system can use logic to merge text blocks into paragraphs using starting and ending indicators. For example, the starting line can be indented, and the ending line can be shorter than other lines in the paragraph (step 511). In some cases, the text blocks may be split when forming paragraphs of text. The system can then label text blocks with inferred semantic information about typographical roles of the paragraphs in the merged text blocks (step 513). Finally, the system can display the article by using the text blocks and images using the reading order determined above and the semantic information. The article 517 is referred to as translated into a so-called small format reflow domain which is device-dependent and easy to read on devices with small displays.

Table of Contents—Detection and Display

Figure 6A:
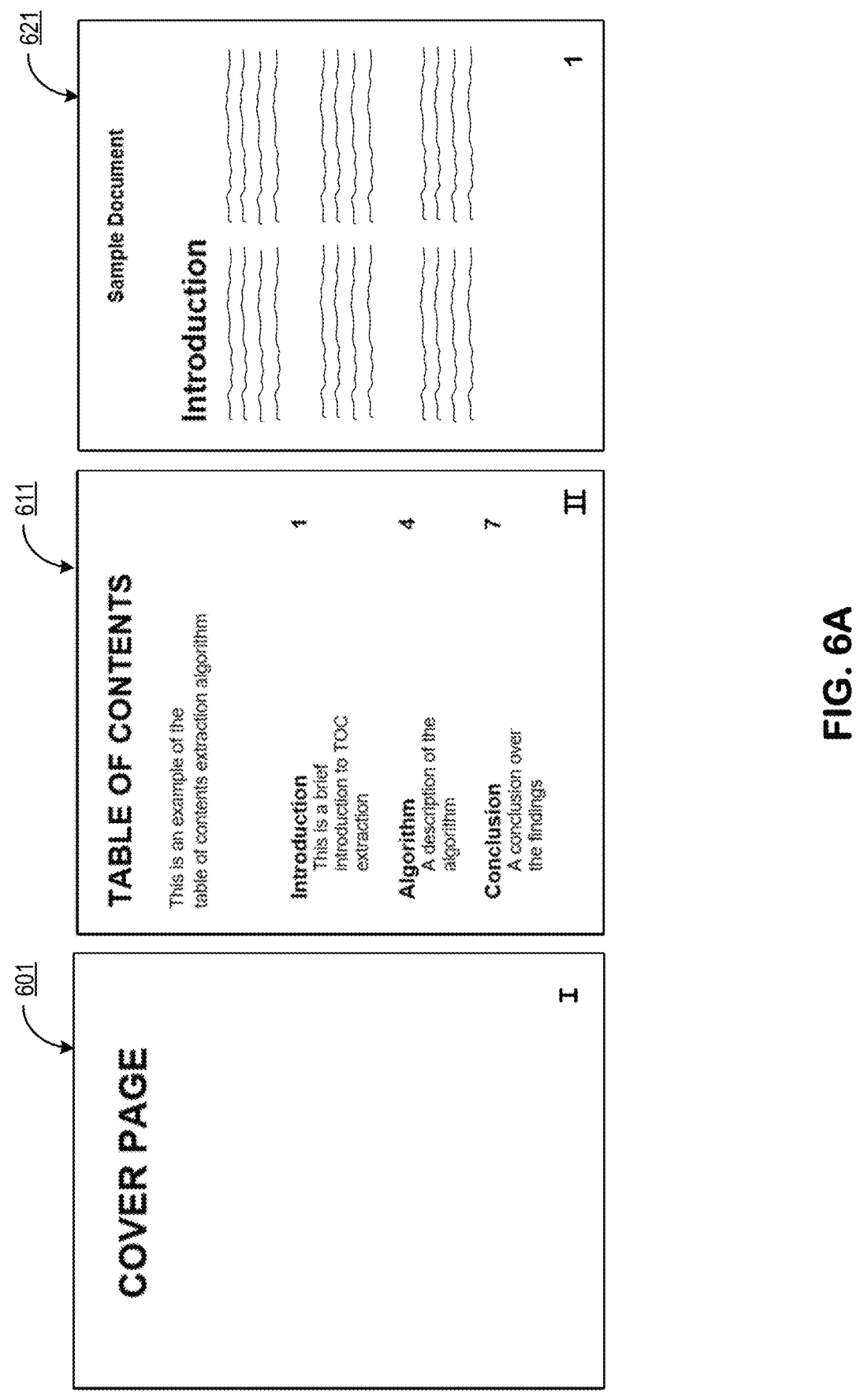

The technology disclosed includes a second automated process that applies to magazines and articles that have table of contents. A table of contents can appear near the front of the PDF file. The technology disclosed can recognize a table in a magazine or an article as a table of contents. FIG. 6A presents first three pages of an example magazine from a PDF file. The first page 601 is a cover page and may contain title of the magazine and related information. The first page is numbered as "I". The second page 611 is a table of contents and is labeled with a page number "II". The third page 621 is a first page of the first article in the magazine. The page 621 is labeled with a page number "1". The calculated offset for all table of contents entries is 2. For example, the first article "Introduction" starts at a page number "1" which is natural page number "3" (i.e., 1+2). Therefore, the article starts at natural page number "3" in the PDF file. The system can calculate natural page numbers for all articles in the table contents and use these to access the articles in the magazine in response to a selection.

FIG. 6B presents the table contents 611. The table of contents consists of entries for articles in the magazine. An entry can consist of multiple lines of text as shown in FIG. 6B. Multiple lines of text for each entry align with one page number in the right hand column of the table of contents. For example, the first article "Introduction" starts at page "1" which is natural page "3" in the PDF file as shown in FIG. 6A. The entry for the first article includes additional lines of text below the headline as shown in FIG. 6B. The technology disclosed includes logic to detect a table that includes page numbers and multiple columns. The page numbers can be positioned in the right hand or left hand column of the table.

Figure 7A:
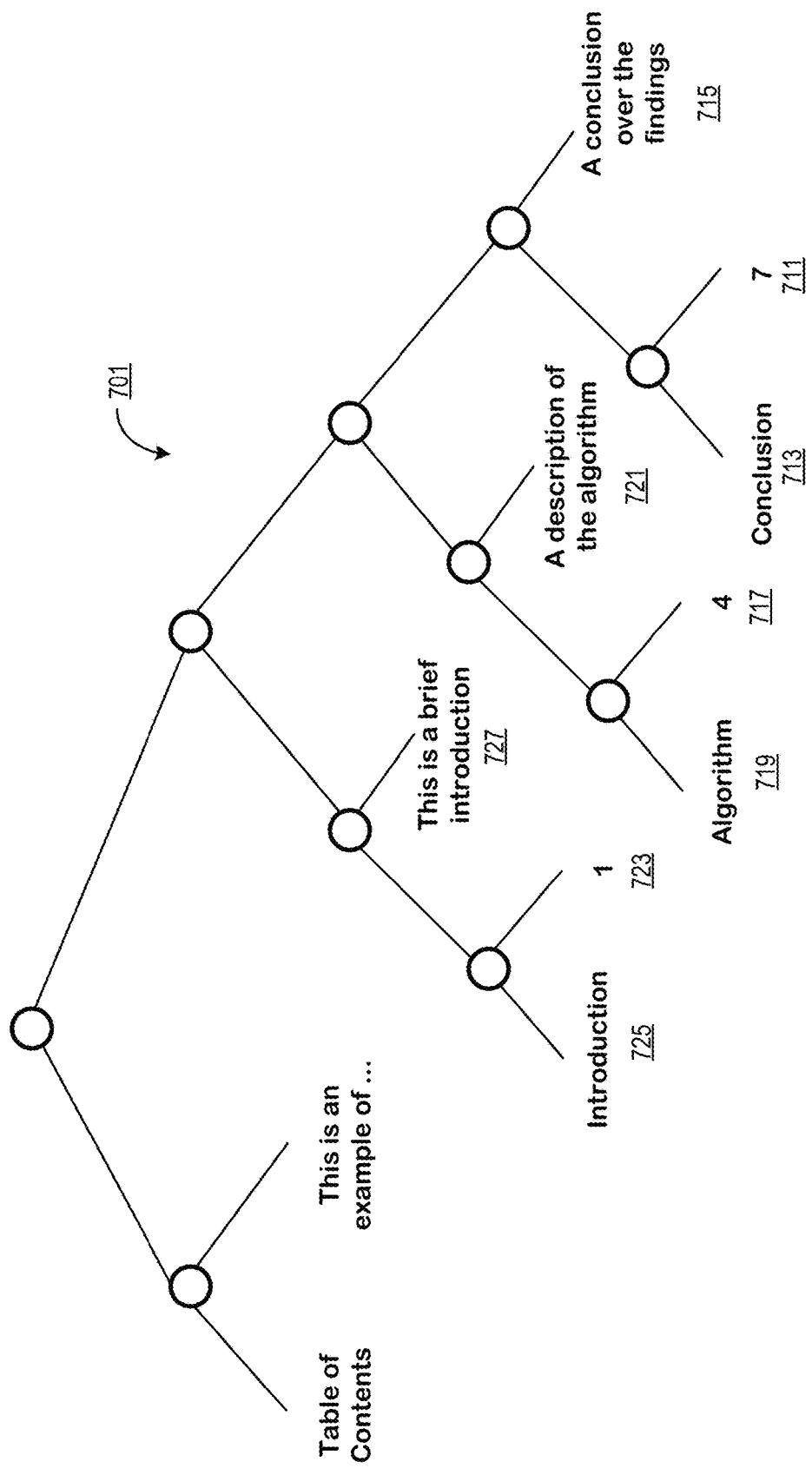
FIG. 7A presents an example tree data structure created by the system after parsing a Table of Contents.

FIG. 7A presents an example tree data structure that can be created by the technology disclosed for the table of contents shown in FIG. 6B. The tree data structure can be created by applying the library to render the article from the PDF file as described above. This can result in bounding boxes that contain multiple text blocks of glyphs with font information for the glyphs. The system can then detect a table and partition a contiguous sequence of text representing the table into text blocks of entries and columns. The system can then merge multiple vertically adjoining text blocks that align horizontally with a single page number into a single text block for an entry in the table of contents. In one implementation, the system can generate the table of contents (TOC) entries using the following algorithm which is presented using the example in FIG. 7A.

1. Find "7" (labeled 711)
2. Merge "Conclusion" (labeled 713) and "7" ->TOC entry { title: "Conclusion"; page: 7 }
3. Merge 'TOC entry { title: "Conclusion"; page: 7 }' and "a conclusion of the findings" (labeled 715) ->Toc entry { title: "Conclusion"; page: 7, description: "A conclusion over the findings" }
4. Find "4" (labeled 717)
5. Merge "Algorithm" (labeled 719) and "4" ->TOC entry { title: "Algorithm"; page: 4 }
6. Merge "a description of the algorithm" (labeled 721) with TOC entry { title: "Algorithm"; page: 4 }->TOC entry { title: "Algorithm"; page: 4; description: "a description of the algorithm" }
7. Merge TOC entry { title: "Algorithm"... }and Toc entry { title: "Conclusion" ... }-> Toc entry { title: "Algorithm"...
8. Find "1" (labeled 723)
9. Merge "introduction" (labeled 725)
10. Merge "this is a brief introduction" (labeled 727) ->Toc entry { title: "Introduction"; page: 1; description "this is a brief introduction" }
11. Merge TOC entry { title: "Introduction"; page: 1; description "this is a brief introduction" } and + TOC entry { title: "Algorithm"...
    TOC entry { title: "Introduction"; ... }; TOC entry { title: "Algorithm"...
    title: "Conclusion" ... }
12. No further merging can be done, as no more page numbers exist.

FIG. 7B presents the three table of contents entries in a box 751, generated by the above described algorithm. Each table of contents entry includes the title, page, and description parts. The system can add the offset to the page numbers from the table of contents when accessing the requested article. The above algorithm uses partitioning and merging actions described earlier. After the partitioning and merging, the system can validate the table of contents by detecting in a body of the PDF file a plurality of headlines of articles which appear in an order in both the table of contents and the body of the PDF. If there are multiple tables in the PDF file, the system can generate table of contents for each candidate table by applying the partitioning, merging, and validating actions. The system can calculate score for each candidate table of contents based on detecting in the body of the PDF file, the multiple headlines of articles in the order in which the multiple headlines appears in the candidate. The system can select the table of contents from among the candidates using the score.

Processing Steps for Detecting and Displaying Table of Contents

Figure 8:
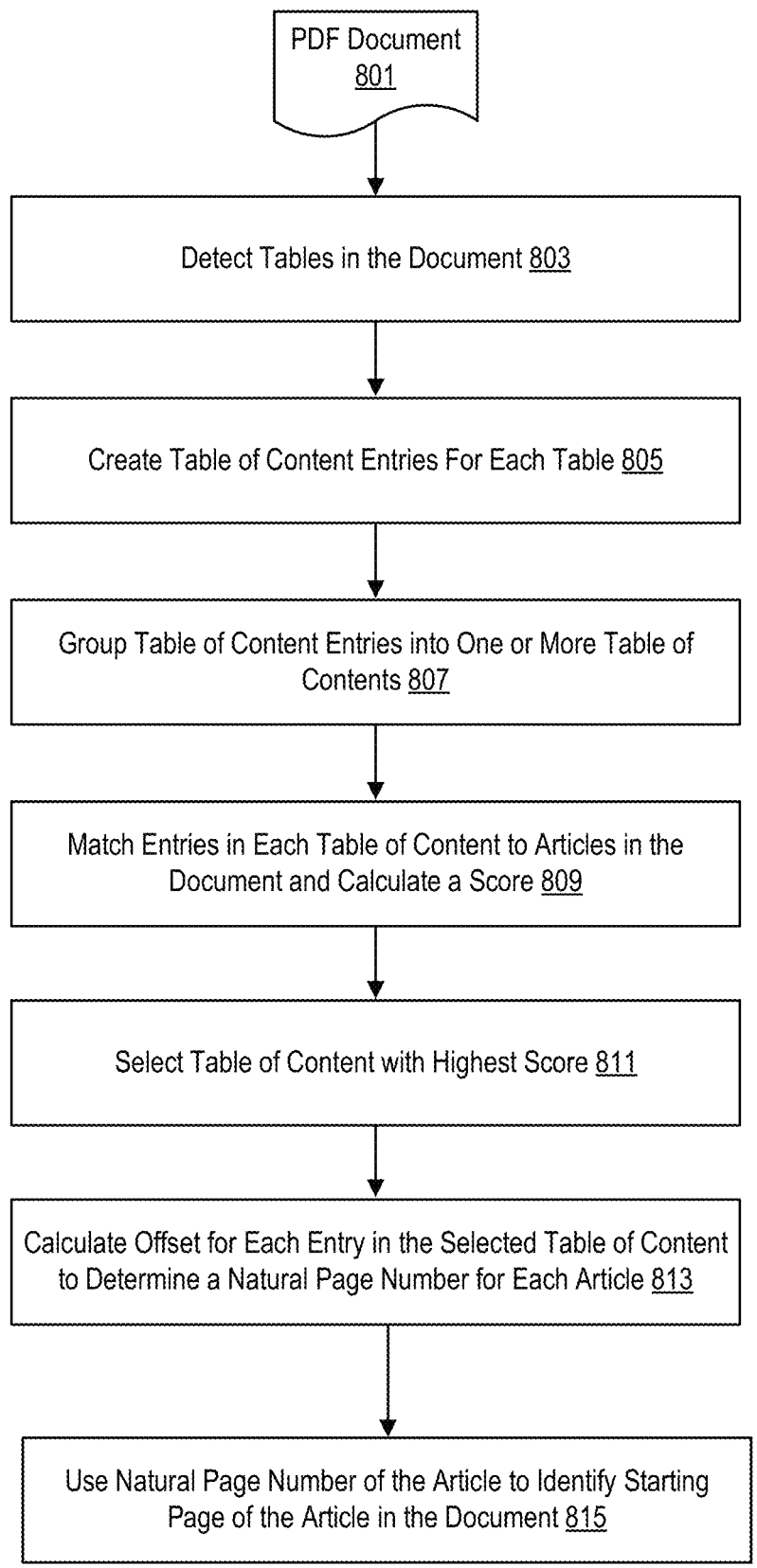
FIG. 8 presents a process flowchart including process steps for creating a Table of Contents for device-dependent display from a PDF file.

FIG. 8 is a flowchart or flow diagram illustrating process steps for detecting and displaying the table of contents. The process starts when a PDF file or PDF document 801 is accessed by a small format device for display. The technology disclosed includes logic to translate the PDF file of interest in real time, using local resources, for device-dependent display on a small format device. The system can detect tables in the PDF document at a step 803. The system can create table of contents for candidate tables at a step 805. At a step 807 the entries are combined or grouped to form a table of contents. If multiple tables are parsed, this step can result in multiple tables of contents. The system calculates a score for each table of contents by matching entries in the table of contents with headlines of articles in the PDF file in the same order as they appear in the table of contents (step 809). The table with highest score is selected for display as table contents (step 811). The system can calculate offset for each entry in the selected table of contents to determine a natural page number for each article's starting page (step 813). The system uses the natural page numbers for accessing the articles in the PDF file when selection is made by a user (step 815).

Particular Implementations—Device Dependent Display of An Article from PDF File

We describe various implementations of device-dependent display of an article from a PDF file that has multiple columns in at least parts of the article.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed provides a device-dependent display of an article from a PDF file that has multiple columns in at least parts of the article. The method includes using a library (e.g., PDFium available at <pdfium.googlesource.com/pdfium/>) to render the article from the PDF file. This includes rendering a plurality of bounding boxes, positioned at on-page coordinates. The bounding boxes can contain one or more images and multiple text blocks of glyphs with font information for the glyphs. The method includes partitioning the text blocks and images into two or more columns and one or more sections of the article using dynamically adjusted valleys between the columns. The sizes of valleys can be adjusted according to the font information for the glyphs in adjoining text blocks. For example, the valley size can be increased for headline text that is printed in larger font size as compared to body text. This avoids splitting of headlines having multiple lines of text in separate partitions or segments. The method includes setting a reading order of the article after rendering. Text blocks that span more than half of a width of a page are pulled out before reading order is determined. Examples such text blocks include pull quotes, or header and footers in page margins. Following this, the method reflows text blocks to produce the reading order.

The method includes merging the text blocks as they appear in the reading order into paragraphs of text using the font information. The method can use starting and ending positions of horizontally arranged text elements in the text blocks to delimit the paragraphs. The method includes inferring semantic information about typographic roles of the paragraph in the merged text blocks from at least the font information. The font information can include font name, font size distribution for sequences of the glyphs, font ascent, font descent, font height, font width. The method includes causing display of the article in a device-dependent format.

This method implementation and other methods disclosed optionally include one or more of the following features. This method can also include features described in connection with systems disclosed. In the interest of conciseness, alternative combinations of method features are not individually enumerated. Features applicable to methods, systems, and articles of manufacture are not repeated for each statutory class set of base features. The reader will understand how features identified in this section can readily be combined with base features in other statutory classes.

These methods, systems and articles of manufacture are efficient enough to run on local resources of a mobile, tablet, handheld or even wearable device. Libraries are available to decode PDF files using local resources. The additional steps required to translate intermediate rendering of a PDF file into a device-dependent format suitable for a display on a handheld device can readily be executed using local resources. The same approach could, of course, be applied using a server or some service that supplies PDF files to a mobile device.

The technology disclosed can use advances and offsets of characters indicating locations of characters in the bounding box for merging and splitting of text blocks and delimiting the paragraphs of text. The method can split some of the text blocks into separate paragraphs of text.

The method includes using variation in vertical spacing between the horizontally arranged text elements during the merging of text blocks into paragraphs.

The method includes inferring the semantic information about the typographic role of the paragraphs such as distinguishing among headline text, subtitle text, body text, byline text, image attribution text, and image caption text. The method includes annotating the paragraphs with the inferred semantic information.

The method includes displaying images with the article in display-dependent format.

The method includes dynamically adjusting valleys by increasing the threshold for valley width when detecting a valley separating characters in large font sizes.

Each of the features discussed in this particular implementation section for the one method implementation apply equally to all other method implementation, except where incompatible. As indicated above, all the method features are not repeated in subsequent methods and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Computer readable media (CRM) implementations of the technology disclosed include a non-transitory computer readable storage medium impressed with computer program instructions, when executed on a processor, implement the methods described above.

Each of the features discussed in this particular implementation section for the method implementation apply equally to the CRM implementation. As indicated above, all the system features are not repeated here and should be considered repeated by reference.

A system implementation of the technology disclosed includes one or more processors coupled to memory. The memory is loaded with computer instructions to generate a device-dependent display of an article from a PDF file that has multiple columns in at least parts of the article. The system includes logic to access a library (e.g., PDFium available at <pdfium.googlesource.com/pdfium/>) to render the article from the PDF file. This includes rendering a plurality of bounding boxes, positioned at on-page coordinates. The bounding boxes can contain one or more images and multiple text blocks of glyphs with font information for the glyphs. The system includes logic to partition the text blocks and images into two or more columns and one or more sections of the article using dynamically adjusted valleys between the columns. The sizes of valleys can be adjusted according to the font information for the glyphs in adjoining text blocks. For example, the valley size can be increased for headline text that is printed in larger font size as compared to body text. This avoids splitting of headlines having multiple lines of text in separate partitions or segments. The system can set a reading order of the article after rendering. Text blocks that span more than half of a width of a page are pulled out before reading order is determined. Examples such text blocks include pull quotes, or header and footers in page margins. The system includes logic to reflow text blocks to produce the reading order.

The system includes logic to merge the text blocks as they appear in the reading order into paragraphs of text using the font information. The system includes logic to use the starting and ending positions of horizontally arranged text elements in the text blocks to delimit the paragraphs. The system includes logic to infer semantic information about typographic roles of the paragraph in the merged text blocks from at least the font information. The font information can include font name, font size distribution for sequences of the glyphs, font ascent, font descent, font height, font width. The system includes logic to cause display of the article in a device-dependent format.

Each of the features discussed in this particular implementation section for the method implementations apply equally to this system implementation, except where incompatible. As indicated above, all the method features are not repeated for the system above and should be considered repeated by reference.

Other implementations may include a non-transitory computer readable storage medium storing instructions executable by a processor to perform functions of the system described above. Yet another implementation may include a method performing the functions of the system described above.

A computer readable storage medium (CRM) implementation of the technology disclosed includes a non-transitory computer readable storage medium impressed with computer program instructions to generate device-dependent display of an article from a PDF file. The article can have multiple columns in at least parts of the article. The instructions when executed on a processor, implement the method described above.

Each of the features discussed in this particular implementation section for the method implementation apply equally to the CRM implementation. As indicated above, all the method features are not repeated here and should be considered repeated by reference.

Particular Implementations—Article and Table of Contents Detection

We describe various implementations of device-dependent display from a PDF file that has multiple articles and a table of contents to the articles.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed provides a device-dependent display from a PDF file that has multiple articles and a table of contents to the article. The method includes using a library (e.g., PDFium available at <pdfium.googlesource.com/pdfium/>) to render the article from the PDF file. This includes rendering a plurality of bounding boxes, positioned at on-page coordinates. The bounding boxes can contain one or more images and multiple text blocks of glyphs with font information for the glyphs. The method includes detecting at least one table in a first quarter of the PDF file that includes page numbers and multiple columns. The page number can be in a right hand or left hand column of the table. The method includes partitioning a contiguous sequence of text representing the table into text blocks of entries and columns. The method includes merging vertically adjoining text blocks that align horizontally with a single page number into a single text block for an entry in the table of contents. The method includes validating the table of contents by detecting in a body of the PDF file a plurality of headlines of articles which appear in an order in both the table of contents and the body of the PDF. Finally, the method includes causing display of the table of contents in a device-dependent format including the entries from the merged text blocks.

This method implementation and other methods disclosed optionally include one or more of the following features. This method can also include features described in connection with systems disclosed. In the interest of conciseness, alternative combinations of method features are not individually enumerated. Features applicable to methods, systems, and articles of manufacture are not repeated for each statutory class set of base features. The reader will understand how features identified in this section can readily be combined with base features in other statutory classes.

As above, these methods, systems and articles of manufacture are efficient enough to run on local resources of a mobile, tablet, handheld or even wearable device. Libraries are available to decode PDF files using local resources. The additional steps required to translate intermediate rendering of a PDF file into a device-dependent format suitable for a display on a handheld device can readily be executed using local resources. The same approach could, of course, be applied using a server or some service that supplies PDF files to a mobile device.

In one implementation, the method includes saving offsets at which the plurality of headlines that are detected in the body of the PDF. The method includes receiving a selection of an article from a user responsive to the display of the table of contents. The method includes using a saved offset for the selected article to extract the selected article from the PDF. The method includes preparing it for device-dependent presentation and causing display of the selected article in the device-dependent format.

The method includes detecting a mismatch between a particular entry in the table of contents and an article title in the body of the PDF file. The mismatch can happen when the article title includes more or less words than the particular entry. When a mismatch is detected, the method includes merging the particular entry and an adjoining entry, or splitting the particular entry in the table of contents to match the article title. The method includes updating the table of contents prior to causing display of the table of contents.

The method includes detecting that the table of contents spans multiple pages in the PDF. The method includes using the font information to distinguish the table of content from header and footer information. The method includes merging entries from successive pages of the PDF into the table of contents.

The method includes detecting multiple tables in the first quarter of the PDF that are candidates to be the table of contents. The method includes applying the partitioning, merging and validating actions to each of the candidates. The method includes scoring each of the candidates based on detecting in the body of the PDF file a plurality of headlines of articles in the order in which the plurality of headlines appear in the candidate. The method includes selecting the table of contents from among the candidates using the scoring.

Each of the features discussed in this particular implementation section for the method implementation apply equally to all other method implementation, except where incompatible. As indicated above, all the method features are not repeated in subsequent methods and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Computer readable media (CRM) implementations of the technology disclosed include a non-transitory computer readable storage medium impressed with computer program instructions, when executed on a processor, implement the methods described above.

Each of the features discussed in this particular implementation section for the method implementation apply equally to the CRM implementation. As indicated above, all the system features are not repeated here and should be considered repeated by reference.

A system implementation of the technology disclosed includes one or more processors coupled to memory. The memory is loaded with computer instructions to generate device-dependent display from a PDF file that has multiple articles and a table of contents to the article. The system includes logic to use a library (e.g., PDFium available at <pdfium.googlesource.com/pdfium/>) to render the article from the PDF file. This includes rendering a plurality of bounding boxes, positioned at on-page coordinates. The bounding boxes can contain one or more images and multiple text blocks of glyphs with font information for the glyphs. The system includes logic to detect at least one table in a first quarter of the PDF file that includes page numbers and multiple columns. The page number can be in a right hand or left hand column of the table. The system includes logic to partition a contiguous sequence of text representing the table into text blocks of entries and columns. The system includes logic to merge vertically adjoining text blocks that align horizontally with a single page number into a single text block for an entry in the table of contents. The system includes logic to validate the table of contents by detecting in a body of the PDF file a plurality of headlines of articles which appear in an order in both the table of contents and the body of the PDF. The system includes logic to cause display of the table of contents in a device-dependent format including the entries from the merged text blocks.

Each of the features discussed in this particular implementation section for the method implementations apply equally to this system implementation, except where incompatible. As indicated above, all the system features are not repeated here and should be considered repeated by reference.

Other implementations may include a non-transitory computer readable storage medium storing instructions executable by a processor to perform functions of the system described above. Yet another implementation may include a method performing the functions of the system described above.

A computer readable storage medium (CRM) implementation of the technology disclosed includes a non-transitory computer readable storage medium impressed with computer program instructions to generate device-dependent display from a PDF file that has multiple articles and a table of contents to the articles. The instructions when executed on a processor, implement the method described above.

Each of the features discussed in this particular implementation section for the method implementation apply equally to the CRM implementation. As indicated above, all the CRM features are not repeated here and should be considered repeated by reference.

Computer System

FIG. 9 is a simplified block diagram of a computer system 910 that can be used to implement the functions performed by the article story generator 131 and table of contents generator 151 in FIG. 1.

Computer system 910 typically includes a processor subsystem 914 which communicates with a number of peripheral devices via bus subsystem 912. These peripheral devices may include a storage subsystem 924, comprising a memory subsystem 926 and a file storage subsystem 928, user interface input devices 922, user interface output devices 920, and a network interface subsystem 916. The input and output devices allow user interaction with computer system 910. Network interface subsystem 916 provides an interface to outside networks, including an interface to communication network 918, and is coupled via communication network 918 to corresponding interface devices in other computer systems. For example, communication network 918 may be, or be coupled with, communication link 912. Communication network 918 may comprise many interconnected computer systems and communication links. These communication links may be wireline links, optical links, wireless links, or any other mechanisms for communication of information, but typically it is an IP-based communication network. While in one embodiment, communication network 918 is the Internet, in other embodiments, communication network 918 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 922 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 910 or onto computer network 918.

User interface output devices 920 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 910 to the user or to another machine or computer system.

Storage subsystem 924 stores the basic programming and data constructs that provide the functionality of certain embodiments of the present invention. For example, the various modules implementing the functionality of certain embodiments of the invention may be stored in storage subsystem 924. These software modules are generally executed by processor subsystem 914.

Memory subsystem 926 typically includes a number of memories including a main random access memory (RAM) 930 for storage of instructions and data during program execution and a read only memory (ROM) 932 in which fixed instructions are stored. File storage subsystem 928 provides persistent storage for program and data files, and may include a hard disk drive, a floppy disk drive along with associated removable media, a CD ROM drive, an optical drive, or removable media cartridges. When computer system 910 represents the article story generator 131, the publication database 115, the semantics database 137, and the articles database 157 may be stored in the storage subsystem 924, or it may be stored in a separate facility accessible to the article story generator 131 via communication network(s) 155. The databases and modules implementing the functionality of certain embodiments of the invention may have been provided on a computer readable medium such as one or more CD-ROMs, and may be stored in a non-transitory manner by file storage subsystem 928. The host memory 926 contains, among other things, computer instructions which, when executed by the processor subsystem 914, cause the computer system to operate or perform functions as described herein. As used herein, processes and software that are said to run in or on "the host" or "the computer", execute on the processor subsystem 914 in response to computer instructions and data in the host memory subsystem 926 including any other local or remote storage for such instructions and data.

Bus subsystem 912 provides a mechanism for letting the various components and subsystems of computer system 910 communicate with each other as intended. Although bus subsystem 912 is shown schematically as a single bus, alternative embodiments of the bus subsystem may use multiple busses.

Computer system 910 itself can be of varying types including a personal computer, a portable computer, a workstation, a computer terminal, a network computer, a television, a mainframe, a server farm, or any other data processing system or user device. Due to the ever-changing nature of computers and networks, the description of computer system 910 depicted in FIG. 9 is intended only as a specific example for purposes of illustrating the preferred embodiments of the present invention. Many other configurations of computer system 910 are possible having more or less components than the computer system depicted in FIG. 9.

The invention claimed is:

1. A method of device-dependent display from a PDF file that has a table of contents, the method including:
   using a library to render at least part of the PDF file, including rendering of a plurality of bounding boxes, positioned at on-page coordinates, that contain one or more images and multiple text blocks of glyphs, with font information for the glyphs;
   detecting the table of contents, which includes page numbers;
   partitioning a contiguous sequence of text representing the table of contents into text blocks; and
   merging multiple vertically adjoining text blocks that align horizontally with a single page number into a single text block for an entry to display in the table of contents; and
   wherein a detected offset for an article selected from display of the table of contents is used to, extract the selected article from the PDF, preparing it for device-dependent presentation, and cause display of the selected article in the device-dependent format.

2. The method of claim 1, further including:
   detecting the table of contents in a first quarter of the PDF, which table of contents further includes multiple columns, wherein the page numbers are in a right hand or left hand column of the table.

3. The method of claim 1, further including:
   validating the table of contents by detecting in a body of the PDF file a plurality of headlines of articles which appear in an order in both the table of contents and the body of the PDF; and
   causing display of the table of contents in a device-dependent format, including the entries from the merged text blocks.

4. The method of claim 1, further including:
   the article being selected from display of the table of contents by a user.

5. The method of claim 1, further including:
  detecting a mismatch between a particular entry in the table of contents and an article title in a body of the PDF file, wherein the article title includes more or less words than the particular entry; and
  merging the particular entry and an adjoining entry, or splitting the particular entry in the table of contents to match the article title, responsive to the detected mismatch, and updating the table of contents prior to causing display of the table of contents.

6. The method of claim 2, further including:
  detecting multiple tables in the first quarter of the PDF that are candidates to be the table of contents;
  applying the partitioning, merging, and validating actions to each of the candidates;
  scoring each of the candidates based on at least detecting in a body of the PDF file a plurality of headlines of articles and comparing an order in which the plurality of headlines appear in the body to each of the candidates; and
  selecting the table of contents from among the candidates using the scoring.

7. A system including one or more processors coupled to memory, the memory loaded with computer instructions to generate device-dependent display from a PDF file that has a table of contents, the instructions, when executed on the processors, implement actions comprising:
  using a library to render at least part of the PDF file, including rendering of a plurality of bounding boxes, positioned at on-page coordinates, that contain one or more images and multiple text blocks of glyphs, with font information for the glyphs;
  detecting the table of contents, which includes page numbers;
  partitioning a contiguous sequence of text representing the table of contents into text blocks; and
  merging multiple vertically adjoining text blocks that align horizontally with a single page number into a single text block for an entry for display in the table of contents; and
  wherein a detected offset for an article selected from display of the table of contents is used to, extract the selected article from the PDF, preparing it for device-dependent presentation, and cause display of the selected article in the device-dependent format.

8. The system of claim 7, further implementing actions comprising:
  detecting the table of contents in a first quarter of the PDF, which table of contents further includes multiple columns, wherein the page numbers are in a right hand or left hand column of the table.

9. The system of claim 7, further implementing actions comprising:
  validating the table of contents by detecting in a body of the PDF file a plurality of headlines of articles which appear in an order in both the table of contents and the body of the PDF; and
  causing display of the table of contents in a device-dependent format, including the entries from the merged text blocks.

10. The system of claim 7, further implementing actions comprising:
  the article being selected from display of the table of contents by a user.

11. The system of claim 7, further implementing actions comprising:
  detecting a mismatch between a particular entry in the table of contents and an article title in a body of the PDF file, wherein the article title includes more or less words than the particular entry; and
  merging the particular entry and an adjoining entry, or splitting the particular entry in the table of contents to match the article title, responsive to the detected mismatch, and updating the table of contents prior to causing display of the table of contents.

12. The system of claim 7, further implementing actions comprising:
  detecting that the table of contents spans multiple pages in the PDF; and
  using the font information to distinguish the table of content from header and footer information and to merge entries from successive pages of the PDF into the table of contents.

13. The system of claim 8, further implementing actions comprising:
  detecting multiple tables in the first quarter of the PDF that are candidates to be the table of contents;
  applying the partitioning, merging, and validating actions to each of the candidates;
  scoring each of the candidates based on at least detecting in a body of the PDF file a plurality of headlines of articles and comparing an order in which the plurality of headlines appear in the body to each of the candidates; and
  selecting the table of contents from among the candidates using the scoring.

14. A non-transitory computer readable storage medium impressed with computer program instructions to generate device-dependent display from a PDF file that has a table of contents, the instructions, when executed on a processor, implement a method comprising, the method including:
  using a library to render at least part of the PDF file, including rendering of a plurality of bounding boxes, positioned at on-page coordinates, that contain one or more images and multiple text blocks of glyphs, with font information for the glyphs;
  detecting the table of contents, which includes page numbers;
  partitioning a contiguous sequence of text representing the table of contents into text blocks; and
  merging multiple vertically adjoining text blocks that align horizontally with a single page number into a single text block for an entry to display in the table of contents; and
  wherein a detected offset for an article selected from display of the table of contents is used to, extract the selected article from the PDF, preparing it for device-dependent presentation, and cause display of the selected article in the device-dependent format.

15. The non-transitory computer readable storage medium of claim 14, implementing the method further comprising:
  detecting the table of contents in a first quarter of the PDF, which table of contents further includes multiple columns, wherein the page numbers are in a right hand or left hand column of the table.

16. The non-transitory computer readable storage medium of claim 14, implementing the method further comprising:
  validating the table of contents by detecting in a body of the PDF file a plurality of headlines of articles which appear in an order in both the table of contents and the body of the PDF; and causing display of the table of contents in a device-dependent format, including the entries from the merged text blocks.

17. The non-transitory computer readable storage medium of claim 14, implementing the method further comprising: the article being selected from display of the table of contents by a user.

18. The non-transitory computer readable storage medium of claim 14, implementing the method further comprising:
detecting a mismatch between a particular entry in the table of contents and an article title in a body of the PDF file, wherein the article title includes more or less words than the particular entry; and
merging the particular entry and an adjoining entry, or splitting the particular entry in the table of contents to match the article title, responsive to the detected mismatch, and updating the table of contents prior to causing display of the table of contents.

19. The non-transitory computer readable storage medium of claim 14, implementing the method further comprising:
detecting that the table of contents spans multiple pages in the PDF; and
using the font information to distinguish the table of content from header and footer information and to merge entries from successive pages of the PDF into the table of contents.

20. The non-transitory computer readable storage medium of claim 15, implementing the method further comprising:
detecting multiple tables in the first quarter of the PDF that are candidates to be the table of contents;
applying the partitioning, merging, and validating actions to each of the candidates;
scoring each of the candidates based on at least detecting in a body of the PDF file a plurality of headlines of articles and comparing an order in which the plurality of headlines appear in the body to each of the candidates; and
selecting the table of contents from among the candidates using the scoring.

* * * * *